May 12, 1964     L. C. HANSON     3,133,181
HEATING UNIT
Filed Jan. 30, 1962
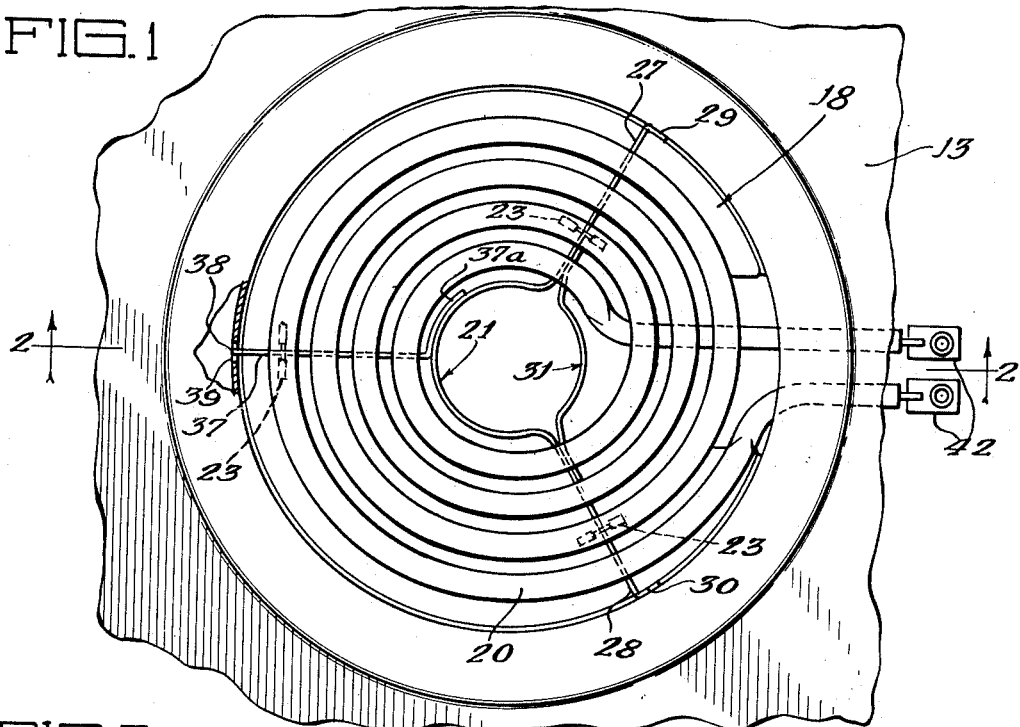
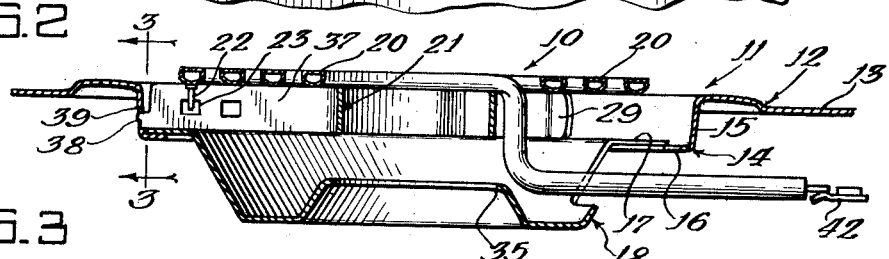
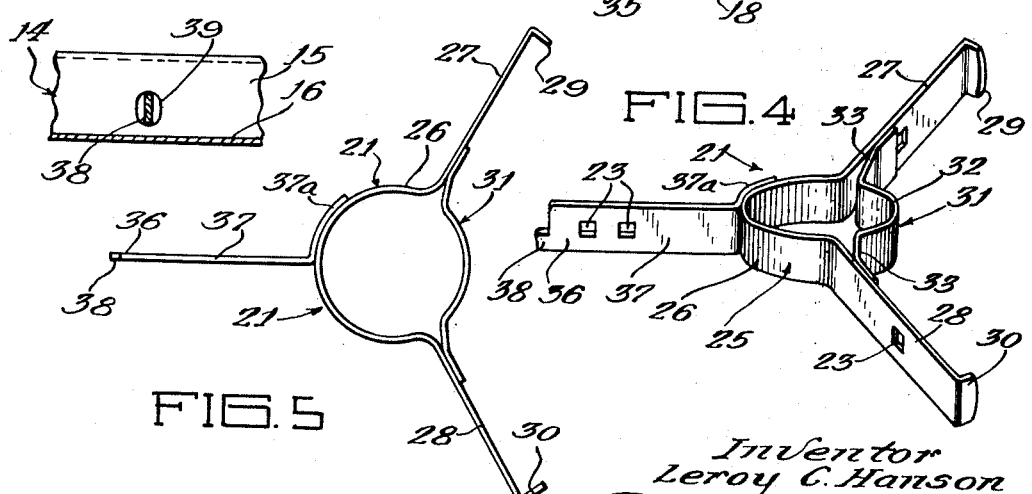
Inventor
Leroy C. Hanson
By: Hofgren, Brady, Wegner,
Allen & Stellman
Attorneys United States Patent Office 3,133,181
Patented May 12, 1964

3,133,181
HEATING UNIT
Leroy C. Hanson, Elmhurst, Ill., assignor to Ferro Corporation, a corporation of Ohio
Filed Jan. 30, 1962, Ser. No. 169,851
2 Claims. (Cl. 219—37)

This invention relates to a heating unit assembly, and more particularly to such an assembly for mounting a heating unit on a supporting base such as a range top or the like, and to a component thereof.

Various expedients for mounting heating units on a range top or other cooking surface are well known in the art. Heating units of the electric type normally include a sheathed electric heating element mounted on a spider which is supported in a countersunk portion of the cooking surface. The heating unit should be easily removable for cleaning and it is therefore not entirely satisfactory to provide anchors which require the use of tools in order to release the heating unit, or anchors of any type which cannot be easily cleaned. Furthermore, the entire assembly should be rugged and durable, and in order to be commercially competitive it must be economic to manufacture and install.

A primary object of this invention is the provision of a new and improved heating unit assembly.

Another object is provision of a new and improved mount for a heating unit.

A more specific object is provision of a new and improved heating unit assembly including a mounting for releasably holding an electric heating element on a supporting base such as a range top or the like. A related object is provision of such a mounting for firmly and resiliently clamping the heating element on the base.

An important object of this invention is to provide a new and improved electric heating unit assembly which is economical to manufacture and durable, and in which a heating unit is firmly mounted on a base for convenient removal and placement of the heating unit on its support.

Additional objects and advantages of the invention will be apparent from the following description and drawings, in which:

FIGURE 1 is a fragmentary plan view of a preferred embodiment of the invention in the form of a heating unit assembly;

FIGURE 2 is a fragmentary vertical sectional view taken generally along the line 2—2 of FIGURE 1;

FIGURE 3 is an enlarged, fragmentary vertical section view taken generally along the line 3—3 of FIGURE 2;

FIGURE 4 is a perspective view of a spider removed from the heating unit assembly; and FIGURE 5 is a plan view of the spider shown in FIGURE 4.

While this invention is susceptible of embodiment in many different forms, there is shown in the drawings and will herein be described in detail one specific embodiment, with the understanding that the present disclosure is to be considered as an exemplification of the principles of the invention and it not extended to limit the invention to the embodiment illustrated. The scope of the invention will be pointed out in the appended claims.

The invention is, in brief, directed to a heating unit assembly in which a heating unit is firmly supported on a base in such a manner as to be easily removed from and mounted on the base, and of such a nature that all parts may be thoroughly and conveniently cleaned. In the illustrated embodiment a heating unit is in the form of an electric heating element secured to a spider supported on a base in the form of a range top cooking surface. The spider firmly clamps the heating element to the base by means of resilient spider legs which firmly engage a portion of the base and resiliently and releasably interlock the heating unit and the range top.

With particular reference to FIGURES 1 and 2 of the drawings, a heating unit assembly is illustrated in the form of a heating unit 10 firmly and releasably mounted on a base support 11. This base is illustrated in the form of a range top 12 having a cooking surface 13 with a countersunk portion defined in part by generally continuous, depending, L-shaped flange 14. Flange 14 has a generally vertical wall 15 carrying at its lower-extremity an inwardly extending generally horizontal lip 16 which receives a general horizontal peripheral lip 17 of a spill pan 18, so that the pan may be easily lifted from the range top for cleaning and service.

Heating unit 10 is illustrated in the form of a coiled, sheathed electric heating element 20, of any suitable type, mounted on a spider 21 by means of anchors 22 received in spider openings 23 for permitting limited movement between the heating element and spider responsive to expansion and contraction of the heating element as the temperature of the heating element changes.

Spider 21 is shown separately in FIGURES 4 and 5, and includes a resilient member 25 in the form of a strap having a center portion 26 illustrated in generally arcuate form and preferably as a circular segment, and at opposite ends of portion 26 a pair of outwardly extending legs 27 and 28 each having an outer end with feet 29 and 30 which firmly and releasably engage abutment means here in the form of a generally vertical confining surface provided by range top wall 15. A resilient brace 31 reinforces resilient member 25 and has a center portion 32 illustrated in arcuate form, and preferably a generally circular segment which has opposite ends each carrying an outwardly extending arm 33. These arms have outer ends parallel to and rigidly secured to member 25 and more particularly to the legs 27 and 28 respectively. This brace spans the arcuate portion of member 25 and cooperates with this arcuate portion to define a central opening for receiving an optional temperature control device (not shown) extending therethrough and through a central opening 35 in spill pan 18.

Spider legs 27 and 28 extend radially from the center of the spider, as shown in the drawings, and their respective feet 29 and 30 extend circumferentially from the outer ends of these legs for slidably and firmly engaging range top wall 15 and resiliently urging an outer end portion 36 of another spider leg 37 into firm engagement with vertical wall 15 for clamping the heating unit on its base. As illustrated in the drawing, spider leg 37 has an arcuate flange 37a at its inner end, and this flange conforms to the curvature of center portion 26 of member 25 and is firmly and rigidly secured thereto in any suitable manner, for example as by spot welding. More particularly, an outwardly extending finger 38 of the outer portion of leg 37 engages wall 15, and this finger extends into a confining portion of wall 15 which effectively prevents movement of the outer end of leg 37. As shown, this confining portion defines an opening 39 in wall 15. Finger 38 and the surface defining opening 39 provide cooperating index means for properly orienting and effectively preventing rotation of heating unit 10 on support 11.

Spider legs 27, 28 and 37 preferably extend radially and are spaced from each other, but may be disposed in any desired manner so that the spider is resiliently and firmly releasably held on its base. As illustrated in the drawing there are three substantially coplanar legs substantially equally spaced. Also as shown in the illustrated embodiment, the spider is supported on horizontal surface means of the mount, shown here in the form of range top lip 16 and spill pan lip 17, which receive the bottom edges of the spider legs.

In mounting heating unit 10 on its base, heating element terminal ends 42, which may be secured to a suitable terminal block connector (not shown), are inserted through an opening in spill pan 18 so that spider feet 29 and 30 abut wall 15. Spider leg 37 is then pushed downwardly to seat finger 38 in opening 39 of wall 15. It should be noted that while finger 38 holds spider leg 37 relatively fixed, spider feet 29 and 30 may slide circumferentially on wall 15 to compensate for any distortion during heating or cooling of heating unit 10. The heating unit may be easily removed from the range top mounting by merely pressing one of the resilient legs, 27 or 28, in a circumferential direction along flange 14.

I claim:

1. A spider for mounting an electric heating element, comprising: a resilient member having an arcuate center portion and a pair of resilient legs diverging outwardly from said center portion, generally circumferentially extending feet on the outer ends of the resilient pair of legs, said feet being positioned in planes which are disposed at substantially right angles to the length of said resilient legs, a resilient brace spaced from and spanning said center portion and secured to said member to stiffen said center portion, said brace defining with said arcuate portion a generally circular central opening, and another leg firmly secured to and extending from said center portion in a direction generally opposite the direction of the pair of resilient legs and cooperating with the pair of resilient legs for mounting the heating element on the spider.

2. A resilient spider for mounting an electric heating element, comprising: an integral resilient member having an arcuate center portion and a pair of resilient legs diverging radially outwardly from spaced portions of said center portion, said legs having outer ends, a resilient brace spaced from and spanning said center portion and firmly secured to said legs adjacent said center portion for resiliently stiffening said center portion, said center portion and said brace cooeprating with each other to define an opening for receiving a control part, generally circumferentially extending feet on the outer ends of the resilient pair of legs, another leg firmly secured to and extending from said center portion in a radial direction generally opposite the direction of the pair of resilient legs, said other leg having an outer end including an outwardly extending finger portion, said legs being generally coplanar and substantially equally spaced from each other.

References Cited in the file of this patent

UNITED STATES PATENTS

| | | |
|---|---|---|
| 2,668,899 | Rutenber | Feb. 9, 1954 |
| 2,943,178 | Aldous | June 28, 1960 |
| 3,072,775 | Ammerman et al. | Jan. 8, 1963 |